United States Patent
Gunkel et al.

(10) Patent No.: US 9,016,061 B2
(45) Date of Patent: Apr. 28, 2015

(54) PIPE ARRANGEMENT

(75) Inventors: Rolf Gunkel, Friedrichshafen (DE); Jörg Andre Reitz, Salem (DE)

(73) Assignee: MTU Friedrichshafen GmbH, Friedrichshafen (DE)

( * ) Notice: Subject to any disclaimer, the term of this patent is extended or adjusted under 35 U.S.C. 154(b) by 185 days.

(21) Appl. No.: 13/508,508

(22) PCT Filed: Nov. 4, 2010

(86) PCT No.: PCT/EP2010/006718
§ 371 (c)(1),
(2), (4) Date: Jun. 26, 2012

(87) PCT Pub. No.: WO2011/054512
PCT Pub. Date: May 12, 2011

(65) Prior Publication Data
US 2012/0255528 A1    Oct. 11, 2012

(30) Foreign Application Priority Data
Nov. 6, 2009   (DE) .......................... 10 2009 052 167

(51) Int. Cl.
*F02D 23/00*   (2006.01)
*F16M 13/00*   (2006.01)
(Continued)

(52) U.S. Cl.
CPC ......... *F02B 37/013* (2013.01); *Y10T 29/49231* (2015.01); *F01N 13/1811* (2013.01); *F01N 13/1838* (2013.01); *Y02T 10/144* (2013.01)

(58) Field of Classification Search
CPC ............... F01N 13/1811; F02B 37/013; F05B 2220/40; Y02T 10/144
USPC ........... 60/602–612, 280, 323; 123/262, 559; 415/213.1; 248/678, 637
See application file for complete search history.

(56) References Cited

U.S. PATENT DOCUMENTS 5,619,854 A * 4/1997 Ramsden et al. ............... 60/612
2010/0223911 A1* 9/2010 Gockel et al. .................. 60/280

FOREIGN PATENT DOCUMENTS

DE   102006004725 A1   8/2007
DE   102008020745 A1   10/2009
(Continued)

OTHER PUBLICATIONS

English WO2008003905 by Espacenet machine translation.*
(Continued)

*Primary Examiner* — Thai Ba Trieu
*Assistant Examiner* — Deming Wan
(74) *Attorney, Agent, or Firm* — Rader, Fishman & Grauer PLLC

(57) ABSTRACT

Disclosed is a pipe arrangement (1) comprising a pipe element (2) that is used to connect, in particular fluidically connect, a turbine outlet of one turbocharger (15) to a turbine inlet of another turbocharger (17). The pipe arrangement is characterized in that a first pipe section (8) of the pipe element (2) includes a first fastening device (14) for attaching a first turbocharger (15) as well as a second fastening device (20) for attaching the pipe element (2) to a first support element (21) of an internal combustion engine. Furthermore, a second pipe section (9) includes a third fastening device (16) for attaching a second turbocharger (17) as well as a fourth fastening device (24) for attaching the pipe element (2) to a second support element (25) of an internal combustion engine.

17 Claims, 5 Drawing Sheets

(51) Int. Cl.
  *F16M 1/00*  (2006.01)
  *F01D 25/26*  (2006.01)
  *F01D 25/28*  (2006.01)
  *F03D 11/00*  (2006.01)
  *F03D 11/04*  (2006.01)
  *F04D 29/60*  (2006.01)
  *F04B 17/00*  (2006.01)
  *F04B 35/00*  (2006.01)
  *F02B 37/013* (2006.01)
  *F01N 13/18*  (2010.01)

(56) References Cited

FOREIGN PATENT DOCUMENTS

| | | | |
|---|---|---|---|
| EP | 1270890 | A2 | 1/2003 |
| EP | 1679429 | A1 | 7/2006 |
| EP | 1801362 | A1 | 6/2007 |
| EP | 2045454 | A2 | 4/2009 |
| EP | 2050940 | A1 | 4/2009 |
| FR | 2849470 | A1 | 7/2004 |
| FR | 2925113 | A3 | 6/2009 |
| GB | 2060066 | A | 4/1981 |
| WO | WO-2008/003905 | A2 | 1/2008 |
| WO | WO-2008/048918 | A1 | 4/2008 |

OTHER PUBLICATIONS

English translation Japanese Patent 2005120937, Takahashi, Kazuo, published on May 12, 2005, by AIPN machine translation.*

English WO2008003905 by Espacenet machine translation, Jan. 10, 2008.*

* cited by examiner

PIPE ARRANGEMENT

CROSS-REFERENCE TO RELATED APPLICATIONS

This application claims priority to German Patent Application 10 2009 052 167.4 filed on Nov. 6, 2009 and PCT/EP2010/006718 filed on Nov. 4, 2010, which are hereby incorporated by reference in their entireties.

TECHNICAL FIELD

The present disclosure relates to a pipe arrangement.

BACKGROUND

In the field of internal combustion engine technology, and particularly diesel motors, known versions of said diesel motors are equipped with two-stage forced induction systems utilizing a first and a second turbocharger. The turbochargers are, by way of example, exhaust stream turbochargers, but can also be mechanical superchargers. By way of example, in the case of a two-stage turbocharger, a high-pressure turbocharger and low-pressure turbocharger can be connected, wherein the exhaust stream first flows through the high-pressure turbocharger and then the low-pressure turbocharger, for example, and/or drives the same. In order to avoid a rigid connection between the turbochargers and/or the turbine housing of such an arrangement, wherein said connection is then subjected to strong mechanical and thermal loads, the prior art has suggested creating a connection by means of two V-band clamps and an expansion joint and/or a length compensation element, wherein said connection directs the exhaust stream. However, the known arrangements, as well as the connection of the exhaust stream turbochargers to the internal combustion engine, remain under thermal and mechanical loads which are too high, as before, and which require significant constructed space.

Proceeding from this prior art, the present disclosure addresses the problem of suggesting a pipe arrangement which overcomes the disadvantages named above, wherein a first and a second turbocharger can be arranged and connected to each other in limited constructed space, while being subjected to low mechanical and thermal loads, by means of said pipe arrangement.

SUMMARY

According to the disclosure, a pipe arrangement has a pipe element, and the pipe arrangement is configured to create a connection, and particularly to create a fluid connection, between a turbine outlet of an exhaust stream turbocharger and a turbine intake of a different exhaust stream turbocharger, wherein a first pipe section of a pipe element has a first attachment device for the purpose of attachment to a first exhaust stream turbocharger, and has a second attachment device for the purpose of attaching the pipe element to a first support element of an internal combustion engine, and wherein a second pipe section has a third attachment device for the purpose of attachment to a second exhaust stream turbocharger, and has a fourth attachment device for the purpose of attaching the pipe element to a second support element of an internal combustion engine.

According to one configuration of the disclosure, the pipe arrangement has a multi-part pipe element.

In one embodiment of the pipe arrangement, a first end of the pipe arrangement is formed on the first pipe section, and a second end of the pipe arrangement is formed on the second pipe section.

In addition, in one configuration of the pipe arrangement, the first pipe section and the second pipe section are formed as separate and/or independent pipe sections, and particularly are not formed as an integral part.

In a further embodiment of the pipe arrangement, the pipe element has a compensating element and/or a connecting element.

In a further embodiment of the pipe arrangement, the pipe element is formed by a first pipe section, a compensating element, and a second pipe section.

In addition, in a further pipe arrangement, an attachment device of a pipe element is formed as a flange element, and/or has a flange element.

In addition, in one pipe arrangement, the first and the second attachment devices and/or the third and the fourth attachment devices are each designed as an integrated attachment device for both an exhaust turbocharger and a support element.

In one embodiment of the pipe arrangement, an attachment device extends beyond a diameter of the pipe element.

An internal combustion engine is also suggested, wherein the same has a first and second exhaust stream turbocharger, wherein the internal combustion engine has a pipe arrangement, wherein it is possible to direct an exhaust stream from a turbine outlet of the first exhaust stream turbocharger to a turbine inlet of the second exhaust stream turbocharger, wherein the second exhaust stream turbocharger is arranged on the pipe arrangement by means of the first attachment device of the first exhaust stream turbocharger and by means of the third attachment device of the second exhaust stream turbocharger, and wherein the pipe arrangement is arranged on the internal combustion engine by means of the second and the fourth attachment devices.

In one embodiment of the internal combustion engine, the first and the second exhaust stream turbochargers are supported on the internal combustion engine by means of the pipe arrangement.

In a further embodiment of the internal combustion engine according to the disclosure, the supportive attachment provided by means of the pipe arrangement is the only supportive attachment of the first and the second exhaust stream turbochargers to the internal combustion engine.

In addition, an internal combustion engine is also provided, wherein the first pipe section of the pipe element of the pipe arrangement is connected to a first support element, and the second pipe section of the pipe arrangement is connected to a second support element.

According to one embodiment of an internal combustion engine, the first support element is connected to a cylinder head element of the internal combustion engine, and/or the second support element is connected to a piston housing of the internal combustion engine.

A method for the production of an internal combustion engine is suggested, wherein in a first step, a pipe arrangement is arranged on a first and a second support element of the internal combustion engine, and in a second step, a first and a second exhaust stream turbocharger are connected in a fluid connection to the pipe arrangement and are attached to the same as a support.

Additional features and advantages of the disclosure are found in the description of embodiments of the disclosure below, with reference to the illustrated figures which show essential details of the disclosure, and in the claims. The individual features can be incorporated alone or in any and all combinations thereof to realize an implementation of the disclosure.

Preferred embodiments of the disclosure are described in greater detail below with reference to the attached illustrations, wherein:

DETAILED DESCRIPTION

In the following description and in the illustrations, identical reference numbers correspond to elements having the same or a comparable function.

Figure 1:
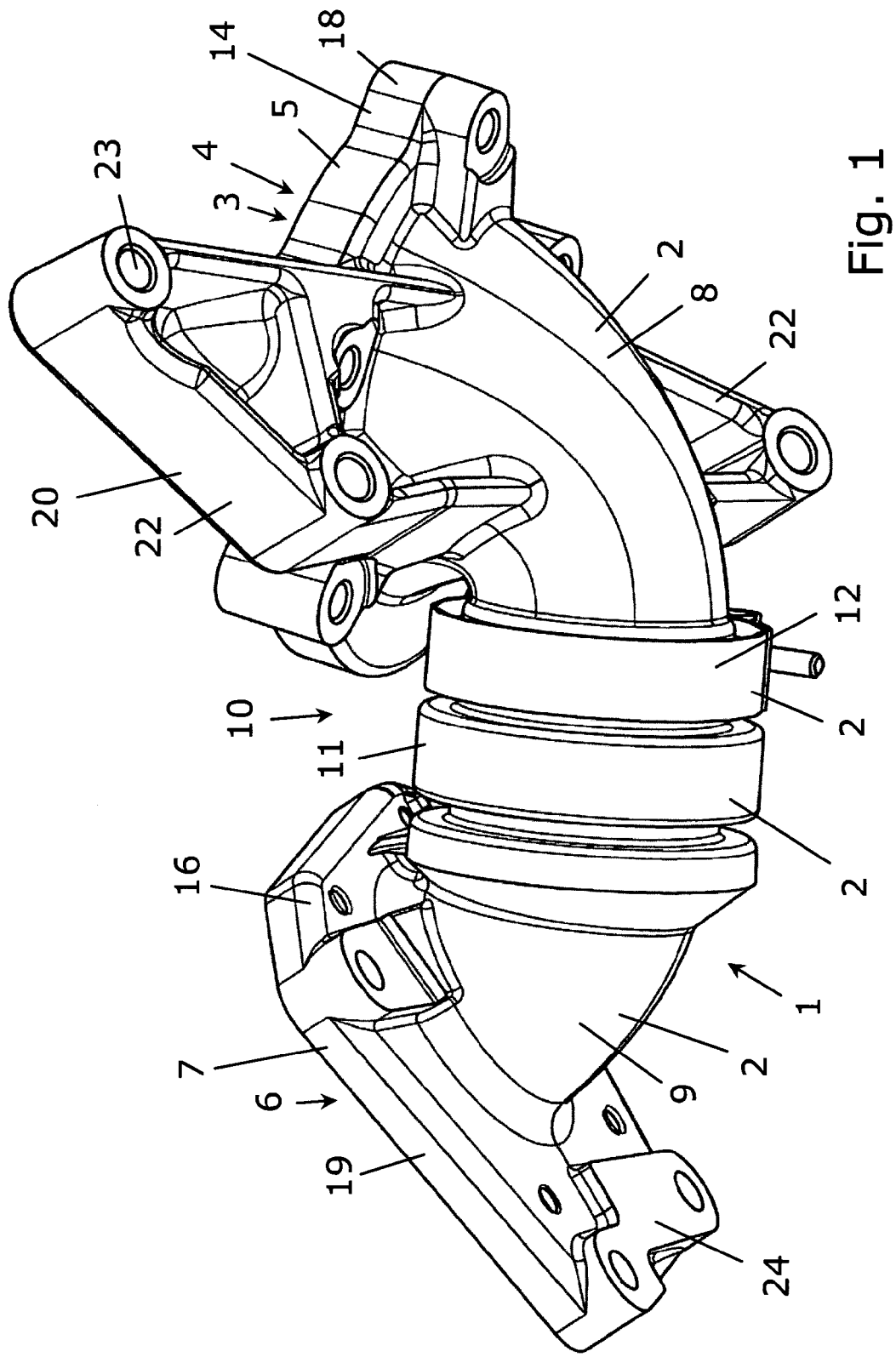
FIG. 1 shows an exemplary pipe arrangement according to one possible embodiment of the disclosure.

FIG. 1 shows a pipe arrangement 1, which serves to create a connection between two exhaust stream turbochargers, and which particularly serves to connect a turbine outlet of an exhaust stream turbocharger to a turbine inlet of a further exhaust stream turbocharger, meaning via a fluid connection. The turbochargers in this case are included as part of a configuration to create a known two-stage forced induction system, by way of example, and are arranged for this purpose, for example, one after the other, wherein a high-pressure turbocharger is arranged upstream from a low-pressure turbocharger, by way of example.

When an internal combustion engine is operated, the exhaust stream thereof first flows through the high-pressure turbocharger, for example, exits the turbine outlet thereof, and flows through the pipe arrangement 1 to the turbine inlet of the low-pressure turbocharger to consequently flow through the same and/or drive the same. In this case, a configuration can be contemplated wherein a part of the exhaust stream is deviated away from and/or bypasses one of the turbochargers, for example the high-pressure turbocharger, for example by means of a waste gate and/or bypass valve, as known in the prior art.

The pipe arrangement 1 has, for example for the purpose of directing an exhaust stream, a pipe element 2 with an inner space 3, wherein said pipe element [2] is formed as a hollow pipe, for example. The inner space 3 connects, for example, a first opening 4 on a first pipe end 5 to a second opening 6 on a second pipe end 7, and as such forms a channel between the openings 4, 6, wherein an exhaust stream can flow and/or be directed through said channel. By way of example, the first opening 4 is included in the configuration as the inlet opening for an exhaust stream proceeding from the first exhaust stream turbocharger and/or the turbine outlet thereof, and the second opening is included as the exhaust opening which directs the exhaust stream to the inlet of the second exhaust stream turbocharger, and particularly to the turbine inlet thereof. As such, the pipe element 1 is intended for the purpose of creating a fluid connection between the first and the second exhaust turbochargers.

The pipe element 2 has a first pipe section 8 which, by way of example, forms the first end 5 of the pipe element 2. In addition, the pipe element 2 has a second pipe section 9 which, by way of example, forms the second end 7 of the pipe element 2. The first and second pipe sections 8, 9 are each designed, by way of example, as a piece of a pipe, and for example as a hollow pipe having an inner space through which a stream can flow. The pipe sections 8, 9 are manufactured, for example, from SiMo cast iron. The pipe sections 8, 9 have a cross-section which is, by way of example, substantially round; however, they can have a shape which is adapted to the inside constructed space or to the implemented arrangement of the exhaust stream turbocharger on the pipe arrangement 1. The pipe pieces and/or pipe sections 8, 9 can each be substantially straight or curved, etc.

The first 8 and the second 9 pipe sections can be connected to each other for the purpose of forming the pipe element 2 of the pipe arrangement 1, or can be connected to further pipe sections to form a pipe element 2.

A connecting element, for example, can be provided to establish the connection, wherein said connecting element is, by way of example, formed on the pipe section 8 and/or 9 as an integral component, or is an independent connecting element, etc. The connecting element is arranged between the first 8 and the second 9 pipe element, for example. In addition, a configuration can be contemplated wherein the pipe element 2 is designed as a single piece together with the first 8 and the second 9 pipe sections, in such a manner that the first and second pipe sections are connected to each other in an integral manner. In this case, a method for establishing a positive-fit connection, for example, can be used.

The pipe element 2 in the present case has, by way of example, a compensating element 10, which is for example a movement compensating element 11, for the purpose of compensating longitudinal and/or transverse movement, wherein said compensating element [10] is provided in the form of an expansion joint, for example, and/or in the form of a torsion compensating element 12, for example in the form of a V-band clamp which compensates for twisting movements (for example counter-opposed rotary movements of the first 8 and the second 9 pipe sections), particularly during installation. The compensating element 10 is included for the purpose of de-coupling the exhaust stream turbochargers from each other, the same being connected via the pipe arrangement 1, particularly with respect to vibrational and/or mechanical coupling of the exhaust stream turbochargers, and particularly during the operation of the internal combustion engine.

The compensating element 10 can be arranged on one end 5 and/or 7 of a pipe section 8 and/or 9, wherein the compensating element 10 in the present case is arranged, for example, between the first 8 and the second 9 pipe sections of the pipe element 1. The compensating element 10, for example in the form of an expansion joint and/or a V-band clamp, connects the first pipe section 8 to the second pipe section 9 between the first end 5 and the second end 7, for example, in a center region of the pipe element 2, for example. An expansion joint in this case is a cylindrical, flexible element for the purpose of compensating movements, in the conventional manner, wherein these movements occur as the result of, for example, thermal loads or vibration of the pipe sections 8 and/or 9.

A known V-band clamp is substantially a band clamp having a V-shaped inner profile, for example in the form of a groove which runs around the inner periphery, wherein a web or a ring flange, for example, is arranged inside said groove during installation, and can rotate guided therein until the final tightening of the V-band clamp.

The V-band clamp can grasp a flange of an expansion joint being arranged thereon, for example, allowing the same to rotate during installation, and as such makes it possible to assemble the first 8 and the second 9 pipe sections with no torsion relative to each other. Once the V-band clamp is tightened as part of the installation process (and is in the closed position), the V-band clamp only carries out the function of a connecting element which connects the first 8 and the second 9 pipe sections, for example, and/or which connects a pipe section to the expansion joint.

To form the pipe element 2, a pipe section 8 and/or 9, for example the second pipe section 9, is connected to the movement compensating element 11 in a permanent manner. The movement compensating element 11, for example an expansion joint, is connected to the pipe section 8 and/or 9 by means of a material connection, for example by laser welding (which reduces the constructed space), and for example laser welding to a flange of the pipe section 9 and/or 8.

Figure 2:
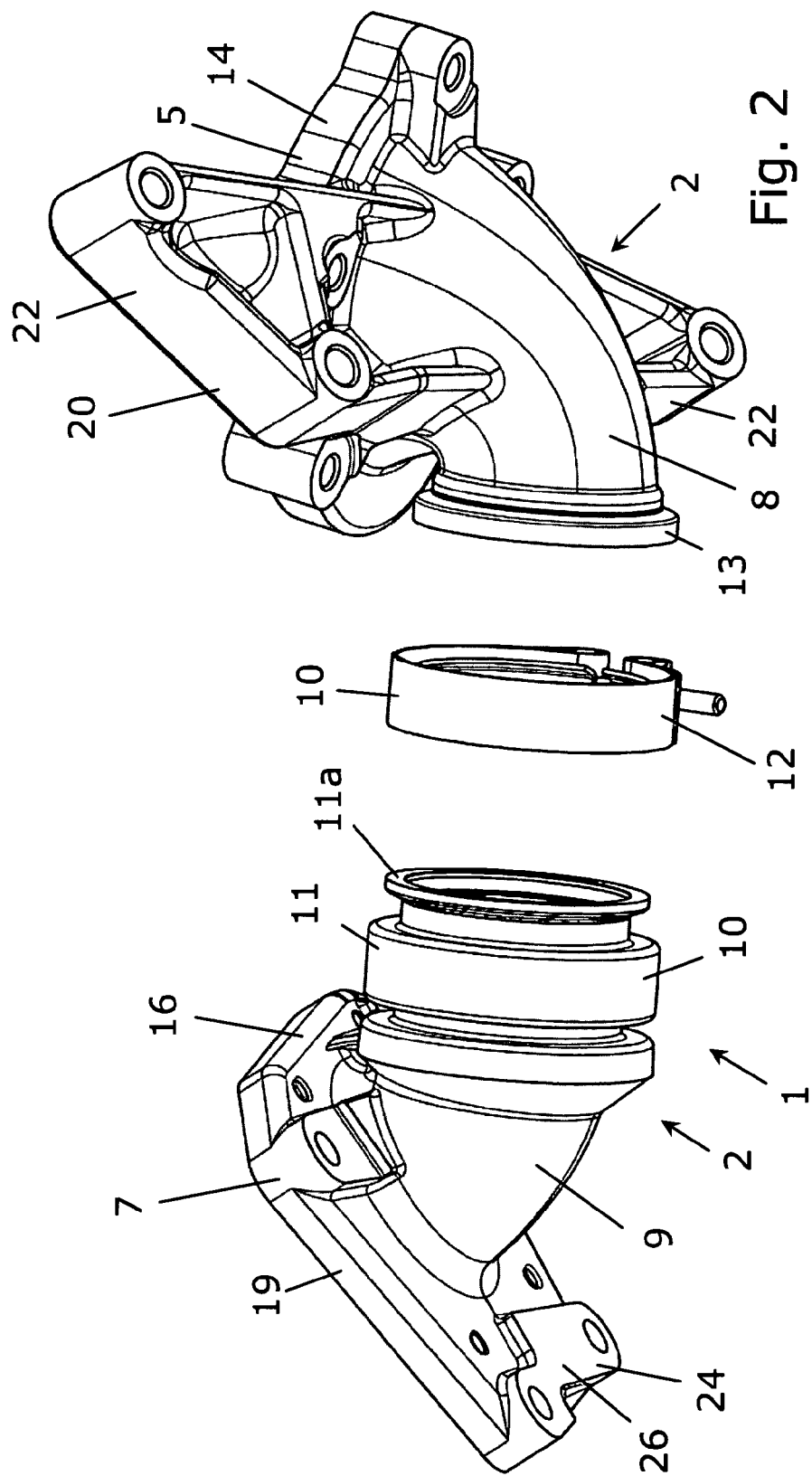
FIG. 2 shows the exemplary pipe arrangement in FIG. 1, partially deconstructed.

The other end of the movement compensating element 11 is connected to the torsion compensating element 12, for example. To this end, a ring flange 11a (FIG. 2) of the movement compensating element 11, for example, is inserted into the torsion compensating element 12, for example in the grooved profile thereof, and is clasped therein in a manner allowing rotary movement. A flange element 13 of a pipe section 8 and/or 9 being connected, for example a ring flange of a first pipe section 8, is likewise clasped in a manner allowing rotary movement by the torsion compensating element 12, for example, and is then connected to the same, for example during the course of an installation, and particularly is rigidly connected thereto, for example by bolting or interlocking, such that a flow channel for an exhaust gas stream is created by the first pipe section 8, the torsion compensating element 12, the movement compensating element 11, and the second pipe section 9, wherein said flow channel is particularly air-tight and open to flow.

Figure 3:
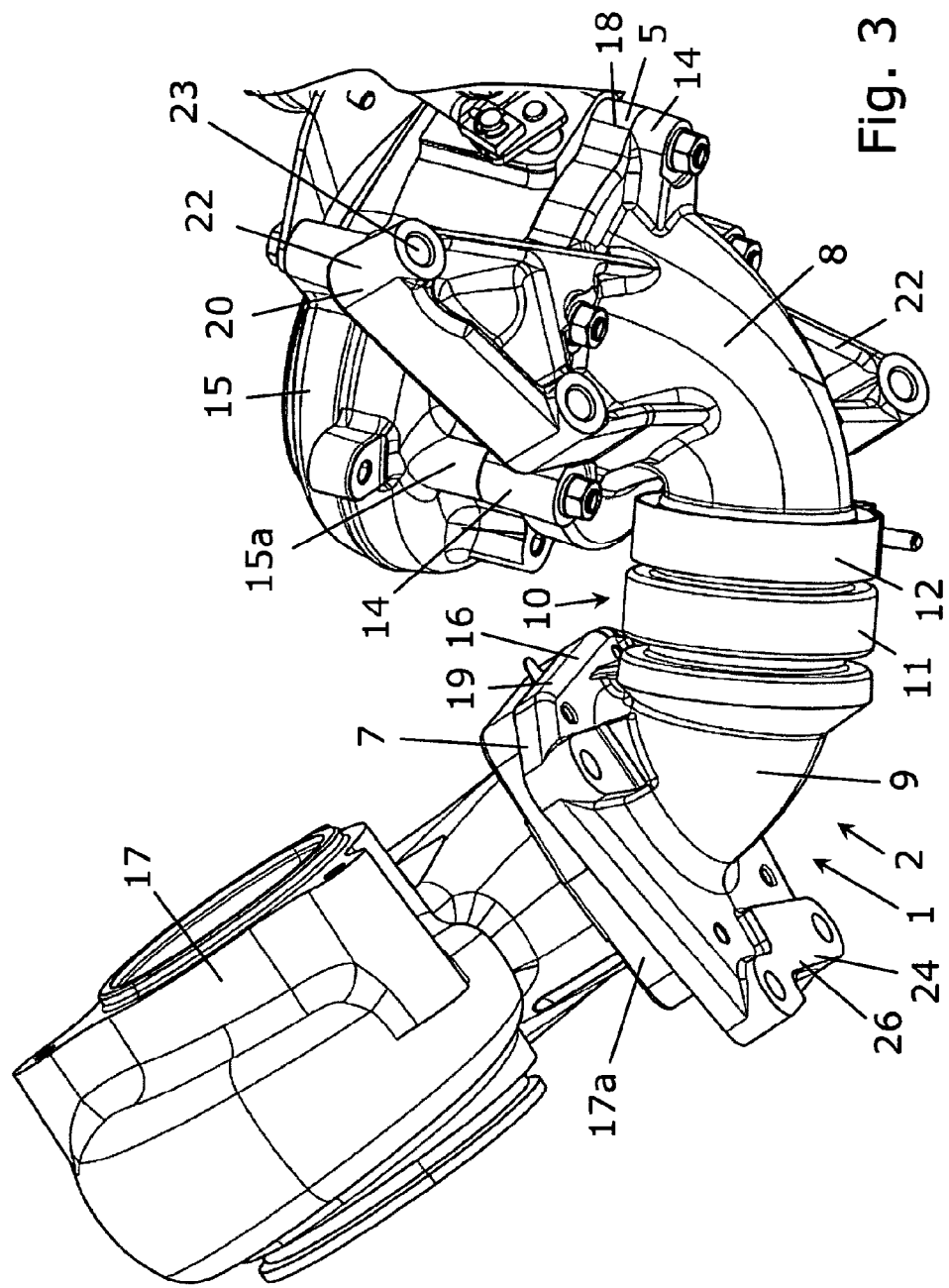
FIG. 3 shows the exemplary pipe arrangement in FIG. 1, arranged between a first and a second turbine housing of two exhaust stream turbochargers.

The first pipe section 8 has a first attachment device 14 for the purpose of attaching a first exhaust stream turbocharger 15 (FIG. 3). The second pipe section 9 has an attachment device 16 (the third attachment device) for the purpose of attaching a second exhaust stream turbocharger 17. The exhaust stream turbocharger 15 is held by means of the first attachment device 14, for example in such a manner that the first opening 4 and the turbine outlet of the first exhaust stream turbocharger 15 overlap.

The second exhaust stream turbocharger 17 is held in a similar manner by means of the third attachment device 16, such that the second opening 6 and the turbine outlet of the second exhaust turbocharger overlap. The attachment devices 14 and/or 16 in this case can each be designed in the form of a flange element 18 and/or 19, wherein the latter works together with a corresponding attachment element 15a and/or a flange element 17a, or with another attachment device of an exhaust stream turbocharger 15 and/or 17 in an attachment. The attachment devices 14 and/or 16 can each also be designed in the form of a projection, for example which projects beyond the diameter of the pipe element 2, or can be designed in another manner for the purpose of attachment to an exhaust stream turbocharger.

Figure 4:
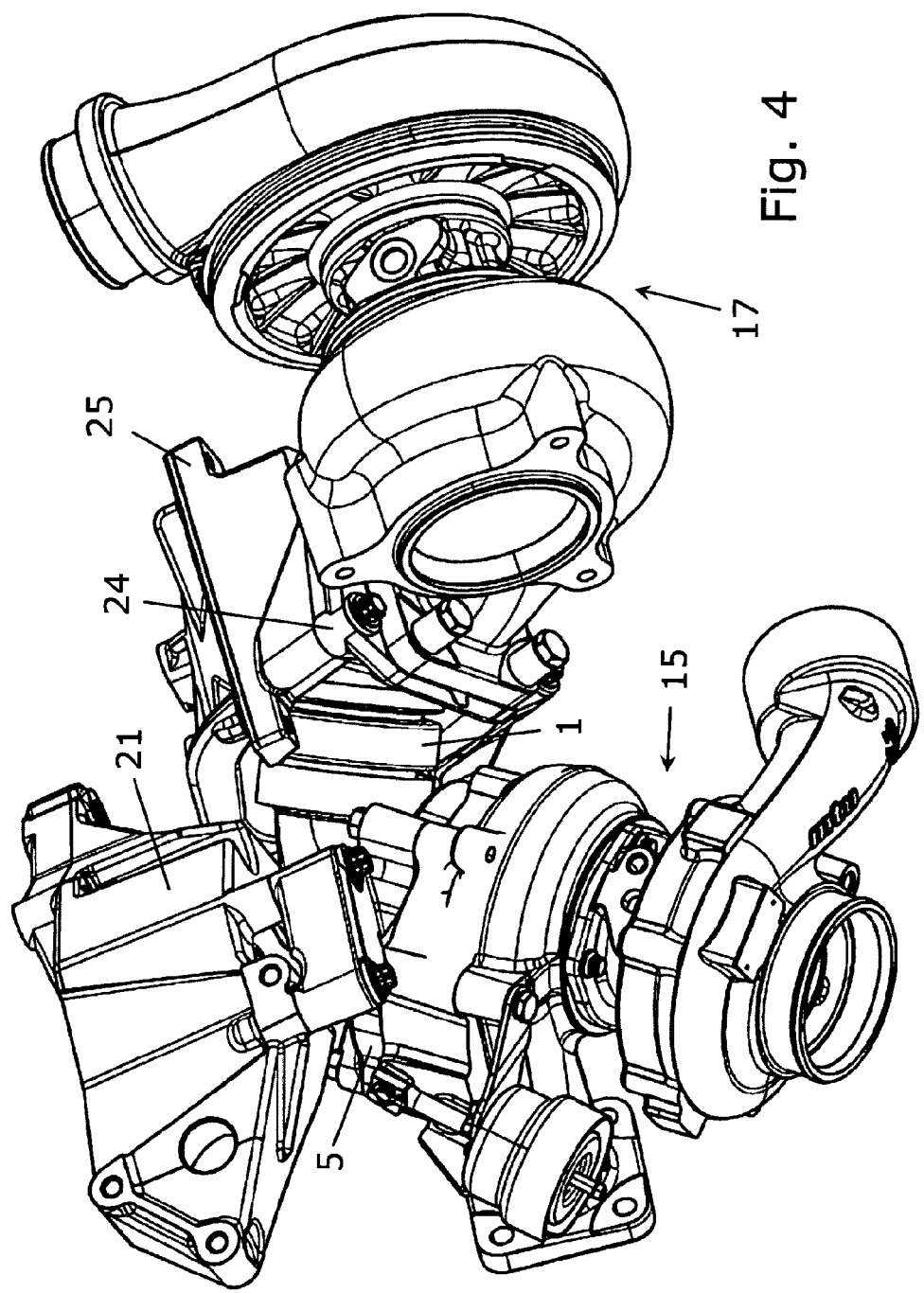
FIG. 4 shows the exemplary pipe arrangement in FIG. 1, arranged between a first and second exhaust stream turbocharger.
Figure 5:
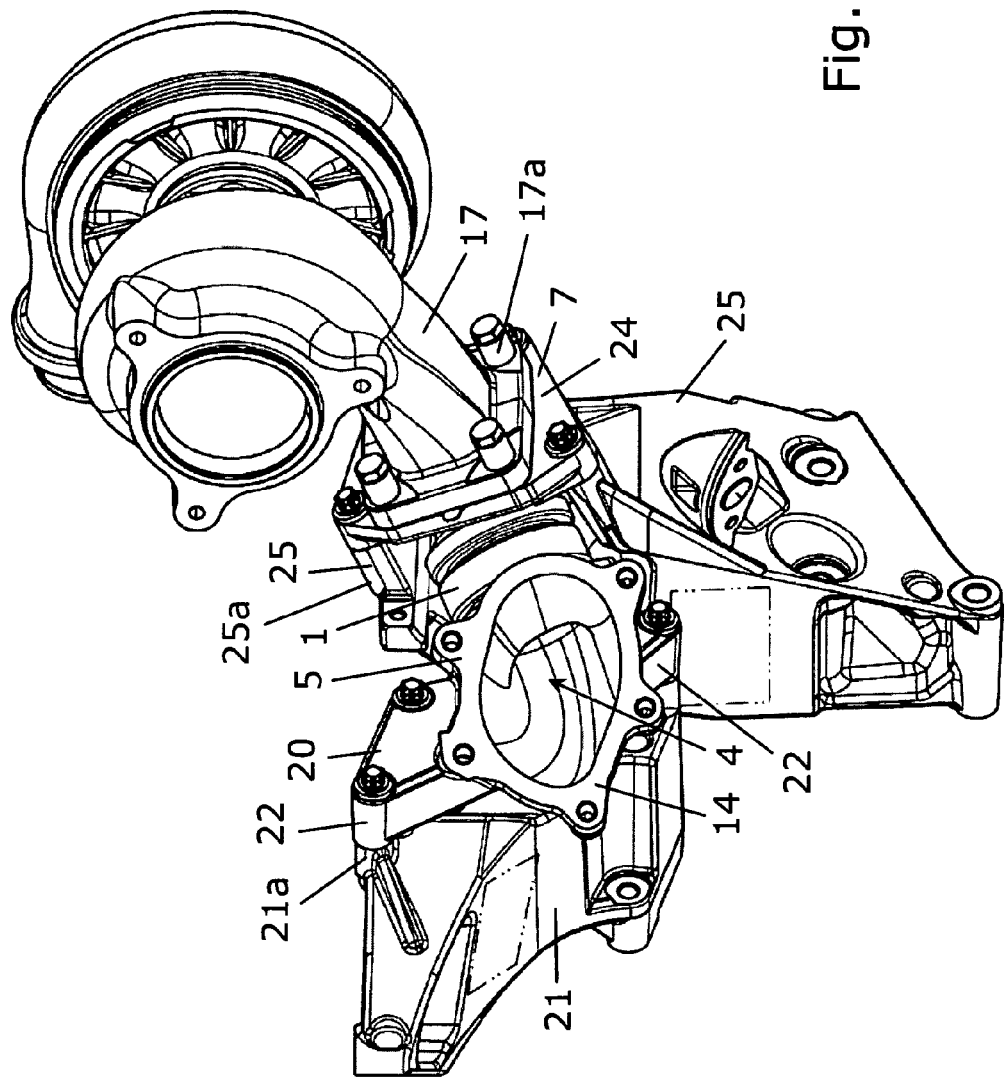
FIG. 5 shows the exemplary pipe arrangement in FIG. 1, arranged on a first and second support element.

In addition, the first pipe section 8 has an attachment device 20 (the second attachment device), for example, which is included for the purpose of creating an attachment of the pipe section 8 to a first support element 21 (FIGS. 4 and 5) of the internal combustion engine. The second attachment device 20 is formed, by way of example, as an integral component with the first pipe section 8, for example in the form of a projection 22, and for example a triangular projection or multiple projections 22, wherein said projection [22] has a hole 23, for example, for the purpose of bolting through the same. The second attachment device 20 corresponds particularly to an attachment device 21a of the support element 21. The second attachment device 20 can also be designed as a flange element, or in another manner which is suitable for the attachment to the support element 21.

By way of example, the first support element 21 in the present case is a holder element, in the form of an adapter with a support function, for example. Said first support element 21 is also, by way of example, a multi-part holder element which can be connected to the cylinder head of an internal combustion engine, for example, and which holds and/or supports an arrangement composed of the pipe arrangement 2 and the exhaust stream turbochargers 15, 17, for example, on a desired position of the internal combustion engine. The first support element 21 can be formed, for example, as an integral component of the internal combustion engine.

The second pipe section 9 has an attachment device 24 (the fourth attachment device) which is included for the purpose of attaching the second pipe section 9 of the pipe element 1 to a second support element 25 of the internal combustion engine, said attachment device [24] for example being a holder or a holder element. The fourth attachment device 24 is designed as a flange element 26, for example, on the second pipe section 9, for example together with the second attachment device 16 in the form of a flange element 19. The fourth attachment device 26 can also be formed as a separate component from the second attachment device 16, or can be designed in another manner, for example as a projecting element, or in another manner which is suitable for attachment to the second support element 25. The fourth attachment device 24 has bore holes, for example, in the flange element 26, and is included for the purpose of bolting, for example, to a corresponding attachment device 25a on the second support element 25, wherein the fourth and/or all of the attachment devices 14, 16, 20 above can also be designed for another manner of attachment, for example by means of known positive-fit, force-fit, or material connections.

The attachment devices 14, 16, 20, 24 can be designed in such a manner that a bolt connection, for example, is situated outside of the region where the exhaust gas stream is directed, such that the configuration can achieve a de-coupling of the devices from heat loads. The first and third attachment devices 14, 16 are particularly designed for the purpose of each holding and supporting one exhaust stream turbocharger 15 and/or 17, while the second 20 and fourth 24 attachment devices are particularly designed for the purpose of each holding one pipe section 8 and/or 9 and supporting the same, for example on a support element 21 and/or 25.

The second support element 25 is formed as an integral component of the internal combustion engine, for example, or as a separate support element included for the purpose of creating a connection to the internal combustion engine, for example, and can moreover be either a single piece or a multi-part component. The support element 25 can be designed as an adapter, for example as described above. In the present case, the second support element 25 is designed and/or included for the purpose of creating a connection to a piston housing of the internal combustion engine, for example, and is formed from two parts, for example. The first 21 and the second 25 support elements support the arrangement composed of the first 15 and the second 17 exhaust stream turbochargers and the pipe arrangement 1, for example, on the internal combustion engine, and hold the same in a constant position.

In the production of an internal combustion engine, the pipe arrangement 1, for example, is first permanently arranged and/or attached on the internal combustion engine. In addition, the second attachment device 20, for example, is connected, and for example bolted, to the first support element 21 which is in turn arranged on the internal combustion engine. The fourth attachment device 24 is connected to the second support element 25, and for example likewise bolted thereto. The first 21 and the second 25 support elements in this case are preferably not designed as one integral component, such that it is possible to decouple the pipe sections 8, 9 which will be arranged thereon, in the event that the first 21 and the second 25 support elements have different locations on the internal combustion engine.

The first exhaust stream turbocharger 15 is permanently arranged, for example bolted, on the pipe arrangement 1, the same being connected to the internal combustion engine as described above, by means of the corresponding attachment devices 14, 15a on the first pipe section 8. The second exhaust stream turbocharger 17 is likewise permanently arranged, for example likewise bolted, on the second pipe section 9 of the pipe arrangement 1 by means of the corresponding attachment devices 16, 17a. As such, an arrangement is created wherein the exhaust stream turbocharger 15, 17 is supported by the pipe arrangement 1, and for example only by the pipe arrangement. The pipe arrangement 1 in this case is supported by the first 21 and the second 25 support elements, by means of the second 20 and the fourth 24 attachment devices, wherein said support elements [21, 25] are arranged on the internal combustion engine.

The invention claimed is:

1. A method for the production of an internal combustion engine having a first and a second exhaust stream turbocharger,
    wherein the internal combustion engine comprises a pipe element configured to provide a fluid connection between a turbine outlet of a first exhaust stream turbocharger and a turbine inlet of a second exhaust stream turbocharger, the pipe element including:
        a first pipe section having a first flange element configured to be secured to the first exhaust stream turbocharger, the first pipe section having a second flange element configured to be secured to a first fixed support element of an internal combustion engine; and
        a second pipe section having a third flange element configured to be secured to the second exhaust stream turbocharger, the second pipe section having a fourth flange element configured to be secured to a second fixed support element of the internal combustion engine wherein the turbine outlet of the first exhaust stream turbocharger is configured to direct an exhaust stream through the pipe arrangement to the turbine inlet of the second exhaust stream turbocharger;
    wherein the first exhaust stream turbocharger is secured to the pipe arrangement by the first flange element, and the second exhaust stream turbocharger is secured to the pipe arrangement by the third flange element; and
    wherein the pipe arrangement is secured to the internal combustion engine by the second and the fourth flange elements;
    wherein the method comprises:
    positioning the pipe arrangement on the first and the second support element of the internal combustion engine; and
    a securing the first exhaust stream turbocharger and the second exhaust stream turbocharger to the pipe arrangement in a fluid connection with the same.

2. The method according to claim 1, further comprising positioning at least one of the flange elements outside a region where the exhaust gas stream is directed, thereby decoupling an attachment of the at least one of the flange elements from an associated heat load.

3. A pipe arrangement, comprising:
    a pipe element configured to provide a fluid connection between a turbine outlet of a first exhaust stream turbocharger and a turbine inlet of a second exhaust stream turbocharger, the pipe element including:
        a first pipe section having a first flange element configured to be secured to the first exhaust stream turbocharger, the first pipe section having a second flange element configured to be secured to a first fixed support element of an internal combustion engine; and
        a second pipe section having a third flange element configured to be secured to the second exhaust stream turbocharger, the second pipe section having a fourth flange element configured to be secured to a second fixed support element of the internal combustion engine.

4. The pipe arrangement according to claim 3, wherein the pipe element is formed as a two-part component.

5. The pipe arrangement according to claim 3, wherein the first pipe section defines a first end of the pipe arrangement, and the second pipe section defines a second end of the pipe arrangement.

6. The pipe arrangement according to claim 3, wherein the first pipe section and the second pipe section are formed as separate pipe sections.

7. The pipe arrangement according to claim 3, further comprising one of a compensating element and a connecting element.

8. The pipe arrangement according to claim 3, wherein the pipe element includes a compensating element joining the first and second pipe sections.

9. The pipe arrangement according to claim 8, wherein the compensating element is configured to compensate for at least one of a longitudinal movement and a transverse movement of at least one of the first and second pipe elements.

10. The pipe arrangement according to claim 3, wherein at least one of the flange elements projects beyond a diameter of the pipe element.

11. The pipe arrangement according to claim 3, wherein at least one pair of the first and second flange elements and the third and fourth flange elements are included in a same flange.

12. An internal combustion engine comprising:
    a first and a second exhaust stream turbocharger, and
    a pipe arrangement configured to provide a fluid connection between a turbine outlet of the first exhaust stream turbocharger and a turbine inlet of the second exhaust stream turbocharger,
    wherein the pipe arrangement further comprising:
        a first pipe section having a first flange element configured to be secured to the first exhaust stream turbocharger, the first pipe section having a second flange element configured to be secure to a first fixed support element of the internal combustion engine; and
        second pipe section having a third flange element configured to be secured to the second exhaust stream turbocharger, the second pipe section having a fourth flange element configured to be secured to a second fixed support element of the internal combustion engine;
    wherein the first exhaust stream turbocharger is secured to the pipe arrangement by the first flange element, and the second exhaust stream turbocharger is secured to the pipe arrangement by the third flange element; and wherein the pipe arrangement is secured to the internal combustion engine by the second and the fourth flange elements.

13. The internal combustion engine according to claim 12, wherein the first and the second exhaust stream turbochargers are supported on the internal combustion engine by the pipe arrangement.

14. The internal combustion engine according to claim 13, wherein the pipe arrangement is the sole structural support of the first and the second exhaust stream turbochargers on the internal combustion engine apart from connections of the first and second exhaust turbochargers permitting gas exchange with the internal combustion engine.

15. The internal combustion engine according to claim 12, wherein the first pipe section is connected to a first support element, and the second pipe section is connected to a second support element, wherein the first and second support elements each include one of a bolt and a flange.

16. The internal combustion engine according to claim 15, wherein the first support element is connected to a cylinder head of the internal combustion engine.

17. The internal combustion engine according to claim 12, wherein at least one of the flange elements is positioned outside a region where the exhaust gas stream is directed, thereby decoupling an attachment of the at least one of the flange elements from an associated heat load.

* * * * *

UNITED STATES PATENT AND TRADEMARK OFFICE
CERTIFICATE OF CORRECTION

PATENT NO.       : 9,016,061 B2                                     Page 1 of 1
APPLICATION NO.  : 13/508508
DATED            : April 28, 2015
INVENTOR(S)      : Rolf Gunkel et al.

It is certified that error appears in the above-identified patent and that said Letters Patent is hereby corrected as shown below:

In the claims

At column 7, claim number 1, line number 65, the word "a" is superfluous and should be deleted.

The claim should read, "securing the first exhaust stream turbocharger and the…"

Signed and Sealed this
Third Day of May, 2016

Michelle K. Lee
*Director of the United States Patent and Trademark Office*